Wallis & Huttmann.
Harvester Rake.
N° 91501      Patented Jun. 15, 1869.
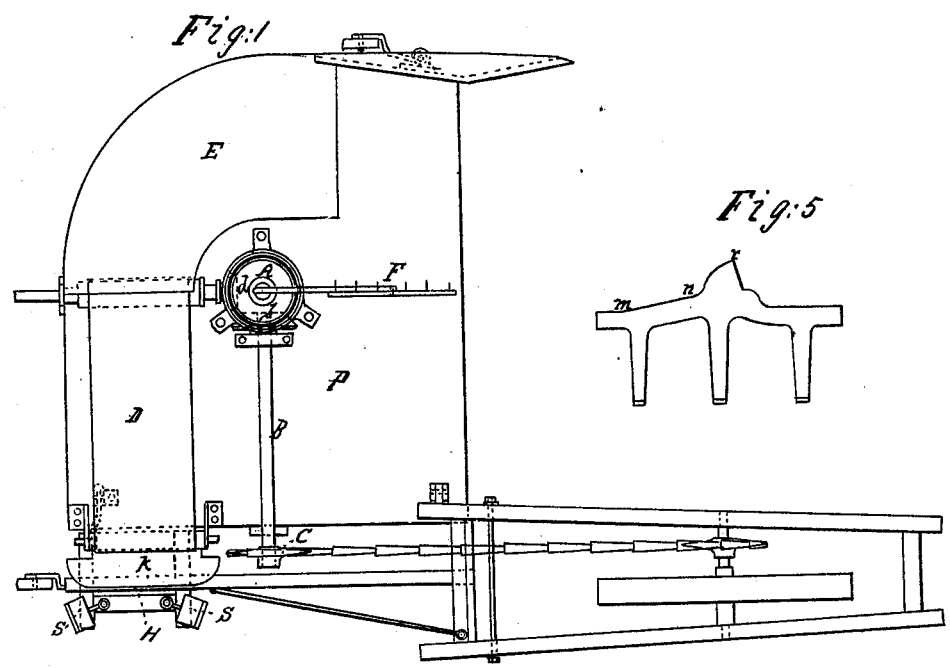
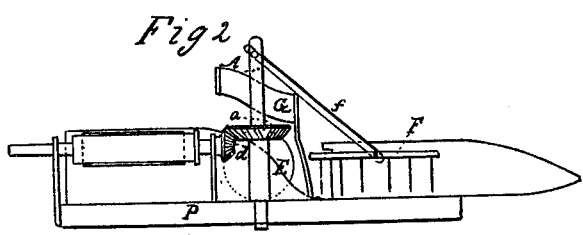
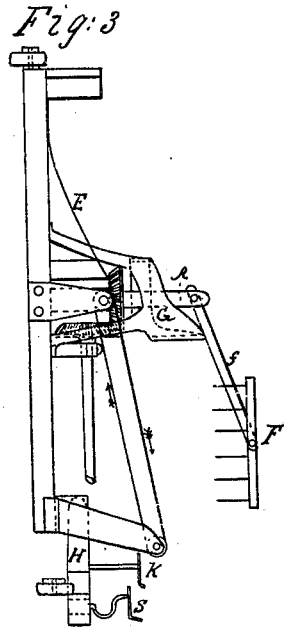
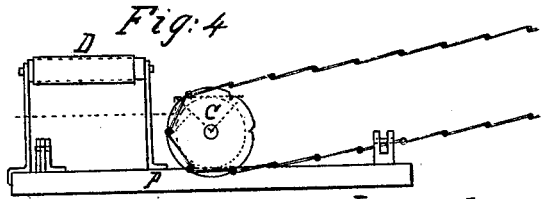
Witnesses
N. R. Kroeber
G. A. Mariner
Inventors
W. J. Wallis & W. E. Huttmann
By Jo. B. Fruchin
their Attorney

UNITED STATES PATENT OFFICE.

WILLIAM J. WALLIS AND WILLIAM E. HUTTMANN, OF CHICAGO, ILLINOIS.

IMPROVEMENT IN HARVESTERS.

Specification forming part of Letters Patent No. 91,501, dated June 15, 1869.

*To all whom it may concern:*

Be it known that we, WILLIAM J. WALLIS and WILLIAM E. HUTTMANN, of the city of Chicago, in the county of Cook and State of Illinois, have invented certain new and useful Improvements in Grain Gathering and Conveying Attachments to Reapers; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Figure 1 is the plan; Fig. 2, a section along the line $x\ x$, Fig. 2. Fig. 3 is the rear side elevation. Fig. 4 is the section along the line $y\ y$, and Fig. 5 is a developed surface of the guiding-cam.

The nature of our invention consists in a rake moving around a pivot, an inclined plane, and an endless belt, the whole placed on the reaper's platform, and so combined and arranged that the grain is gathered on the platfrom and conveyed along the said inclined plane to the endless belt, by which it is delivered onto a bench before the grain-binders, as will be hereinafter fully explained.

Pivot-pin A, provided with a bevel-pinion, $a$, is supported on the platform P, and is operated by a suitable gear (as, for instance, pinion $b$ and shaft B, bearing a pulley, C, connected by a chain with driving-wheel of the reaper, or in some other convenient manner) connected with reaper driving-wheel or wheels.

An endless belt, D, on proper supports, has one of its rollers provided with bevel-pinion $d$, gearing into pinion $a$ of the pivot-pin.

An inclined plane, E, gradually rising in a curvilineal shape from the front part of the platform to the endless belt D, connects the same, thus forming a part of the plane of the circle on which rake F is traveling.

Rake F is loosely pinned to the handle $f$, which in its turn is loosely pinned to the top of the pivot-pin, so that when the rake lies on the platform it drags along it.

If one rake is not sufficient to gather the grain, two or more rakes can be used.

G is the rake-guiding cam. It is secured to the platform so that the pivot-pin A comes in its center, and it has a cylindrical shape, but its upper edge is so arranged that it supports and guides the rake-handle $f$. In front, Fig. 5, this edge is parallel to the platform, so as to allow the rake to gather the grain; but from the point $m$ opposite to where the inclined plane E commences to the point $n$ where it ends the edge is made parallel to this inclined plane, and from point $n$ to point $r$ the edge rises on a sharp curve, so as to take the rake out of the way after it delivers the grain onto the endless belt, and from the point $r$ the edge falls down suddenly, so as to bring the rake again down to the platform.

A small platform, H, attached securely to the reaper's carriage and connected to the platform P by hinges, supports the table K, on which grain is delivered, and seats S S for the binders to sit upon. Each seat is supported by one leg, L, bolted or in some other way secured to the platform H, but always in such a manner that it can revolve or turn, so as to accommodate the binders, who may be sometimes right-handed and sometimes left-handed, in any desired position; or the seats may be so arranged that the leg is stationary, but the seat alone be turned.

The operation of the whole attachment consists in this, that when the grain is falling down on the platform, the rake F gathers it and conveys it along the inclined plane E to the endless belt D, which delivers it on the table K, where the binders bind it.

What we claim as new and our invention, and desire to secure by Letters Patent, is—

1. The combination of the pivoted rake F, operated by the shaft A and cam G, with the circular incline E and endless belt D, all constructed and arranged to operate substantially as and for the purpose set forth.

2. The hinged platform H, attached to the main platform, and supporting the binding-table K and binders' seats S, all arranged as described.

WM. J. WALLIS.
WM. E. HUTTMANN.

Witnesses:
J. B. TURCHIN,
N. K. KROEBER.